United States Patent
Reh

(10) Patent No.: US 6,612,841 B2
(45) Date of Patent: Sep. 2, 2003

(54) INFORMATION SYSTEM FOR PROVIDING EXPLANATORY INFORMATION ON FUNCTIONAL ELEMENTS OR CONTROLS IN MOTOR VEHICLES

(75) Inventor: Frank Reh, Schwieberdingen (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 10/007,666

(22) Filed: Dec. 10, 2001

(65) Prior Publication Data

US 2003/0108847 A1 Jun. 12, 2003

(30) Foreign Application Priority Data

Dec. 8, 2000 (DE) .......................................... 100 61 038

(51) Int. Cl.[7] .............................................. G09B 19/16
(52) U.S. Cl. ....................................................... 434/62
(58) Field of Search ............................................ 434/62

(56) References Cited

U.S. PATENT DOCUMENTS

| 4,700,377 A | * | 10/1987 | Yasuda et al. ........... 379/88.16 |
|---|---|---|---|
| 5,786,764 A | * | 7/1998 | Engellenner .............. 340/572.4 |
| 5,798,693 A | * | 8/1998 | Engellenner .............. 340/10.33 |
| 6,057,756 A | * | 5/2000 | Engellenner ................ 340/505 |
| 6,200,139 B1 | * | 3/2001 | Clapper ........................ 434/62 |

OTHER PUBLICATIONS

Denise McCluggage, "Car's Interior Can Be Confusing for New User", Chicago Sun–Times, Oct. 1992.*

Steinfeld et al., "Use of Passenger Vehicles by Older People with Disabilities", The Occupational Therapy Journal of Research, Summer 1999, vol. 19, No. 3.*

* cited by examiner

*Primary Examiner*—John Edmund Rovnak
(74) *Attorney, Agent, or Firm*—Crowell & Moring LLP

(57) ABSTRACT

An information system for providing explanatory information on functional elements or controls in motor vehicles. The respective functional element or control which is of interest is located with a hand-held computer-supported pointer and the locating data are transferred to a computer-supported controlled and output unit in which a stored information text is selected, using this locating data, and is output to the user via a voice response system.

8 Claims, 2 Drawing Sheets

# INFORMATION SYSTEM FOR PROVIDING EXPLANATORY INFORMATION ON FUNCTIONAL ELEMENTS OR CONTROLS IN MOTOR VEHICLES

BACKGROUND AND SUMMARY OF THE INVENTION

This application claims the priority of German Patent Document 100 61 038.2, filed Dec. 8, 2000, the disclosure of which is expressly incorporated by reference herein.

The invention relates to an information system for providing explanatory information on functional elements or controls in motor vehicles.

In motor vehicles there are a multiplicity of functional elements and controls which are not all self-explanatory on first sight, despite the presence of pictograms or labels, which are in certain cases abbreviated. Although the operation of these elements is explained both in the written operating instructions and when a user takes possession of a new vehicle, investigations have shown that the user does not retain this information permanently in his memory. In addition, it is difficult to read written operating instructions in particular when driving. A further problem is experienced if the user has not been explicitly familiarized with the operation of the vehicle or the operating instructions are not on hand at that particular moment.

At present, systems are being developed which enable explanations on individual controls to be called up by means of a voice inputting system. The explanations are then read out by means of voice synthesis and can be supported by graphics on a display, depending on the situation.

The problem is that the user is obliged to describe the control with which he is not familiar or his locality verbally in an unambiguous way in order to be able to call up the explanation for that element. It is precisely this which presents problems for some drivers, and under certain circumstances also for the voice recognition system, if, for example, unsuitable requests of the type "some sort of funny button down there?" have to be processed.

One way of avoiding this problem can be to place the entire vehicle system in a special explanatory state in response to a certain voice command, for example: "what button is that?", to request the user to press the explanatory button once, to select the corresponding command by pushbutton key and to evaluate this information in this respect, to call up the corresponding explanation and play it audibly. The vehicle system is then returned to the normal state.

A further way of avoiding this problem would be to accommodate an additional information pushbutton key in the vehicle which replaces the specific voice command, for example "what key is that?". There is thus a saving of at least one voice command. The rest of the sequence would be the same as described above.

Apart from the technical and organizational effort involved, these two solutions can of course be implemented only with electrical controls and only with such controls which are coupled to a bus system. Purely mechanical controls, for example seat adjusters, release levers for the handbrake, engine bonnet openers, or even passive elements such as IR receivers for the lock system, displays, labels, could at most be made accessible by means of an additional sensor element which has to be additionally mounted and networked.

Furthermore, with some users there is the reluctance simply to press once controls with which they are unfamiliar, out of fear that they could trigger some unknown, or even dangerous function. In addition, this system functions virtually only at the driver's seat, and explanations on functions are not provided at the rear, in the boot or in the engine space.

The invention is based on the object of providing an information system for motor vehicles which when necessary outputs explanatory information on all the functional elements and controls which are of interest in motor vehicles with an unambiguous assignment to the elements.

The solution, according to the invention is based on the use of a computer-supported pointer which can be picked up in the hand. This is, for example, a pin-shaped or pear-shaped element which is shaped in an ergonomically optimum fashion, comes to a point at the front and is provided with a number of pushbutton keys, and if appropriate with a status display.

In the home position, this pointer is plugged into a special holder so that it does not get in the way during normal driving but is always within reach. If the user then requires an explanation on a functional element or control, he picks up the pointer in his hand and points to or gently touches the element to be explained. A locating system determines the position of the tip and/or of a pointing beam of the pointer and transfers it to the information system, for example via a wire-free link. A stored information text is selected and output to the user using suitable algorithms or assignment tables in a vehicle-mounted control and output unit in accordance with the position information received.

The user can then control the outputting of the information using the keys of the pointer.

The solution according to the invention offers the following advantages:

it is easy to learn,
it can be used intuitively,
it functions independently of the user,
the calling up of the explanations is independent of voice,
it functions principally in all vehicle elements (active, passive, electrical, mechanical) to be explained,
it functions all around the vehicle depending on the locating system,
it can also be used interactively as a Help function with known operating systems in the vehicles of the Applicant, or else in similar systems,
it provides the user with the certainty that a dangerous function is not triggered in error,
it stimulates the user's curiosity in relation to the operation of the vehicle thanks to the possibility of spontaneous exploration,
owing to the successful uses, it leads to a positive identification with the information system and
it can relieve sales personnel, service personnel and Trade Fair personnel of work in terms of the presentation of the vehicle.

Other objects, advantages and novel features of the present invention will become apparent from the following detailed description of the invention when considered in conjunction with the accompanying drawings.

BRIEF DESCRIPTION OF THE DRAWINGS

An exemplary embodiment of the invention is explained in more detail below with reference to the drawing, in which.

DETAILED DESCRIPTION OF THE PREFERRED EMBODIMENT

Figure 1:
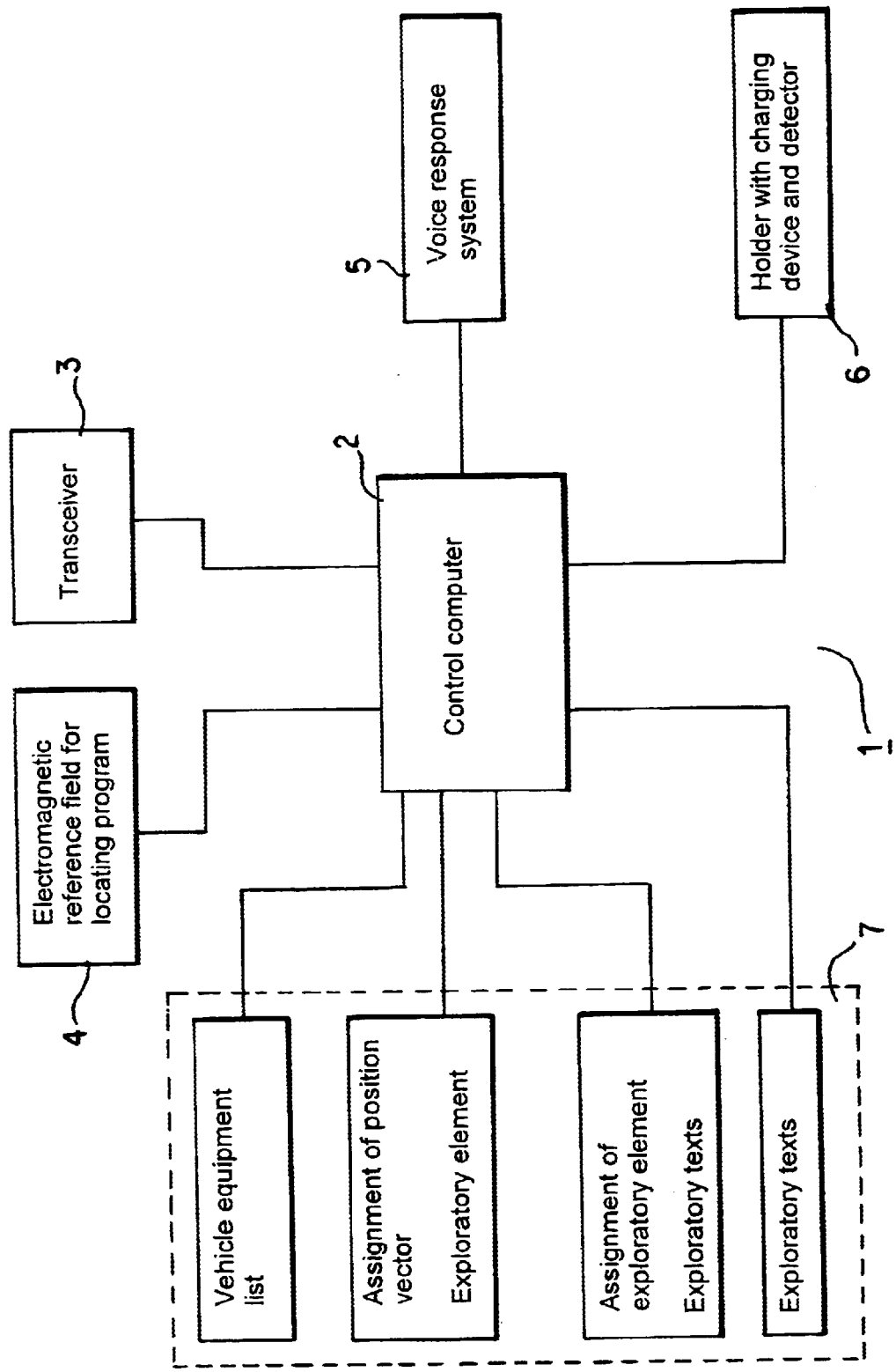
FIG. 1 shows the vehicle-mounted control and output unit of the information system as a block diagram.

The vehicle-mounted control and output unit 1 which is shown in FIG. 1 is composed of a control computer 2, transceiver 3, reference field transmitter 4, a voice response system 5, a holder 6 for the pointer 8 and a database 7.

The transceiver 3 is used for wireless communication with the transceiver 10 of the pointer 8. Alternatively, a line-bound communication can also be made between the pointer 8 and the control and output unit 1. When not in use, the pointer 8 is plugged into the holder 6 and its electrical batteries are charged by means of the electrical charging device. In order to provide the pointer 8 with power in a reliable fashion, it can optionally be equipped with an electrical power management system. When the pointer 8 is located in the holder 6, an automatic position calibration of the locating systems used is also carried out by means of the control computer 2 in the exemplary embodiment described here. The calibration which is carried out in this way is an optional feature and can also be carried out in any other desired fashion known to the person skilled in the art.

The voice response system 5 outputs the selected information via internal loudspeakers in the passenger compartment. The information is selected from the database 7 by means of the control computer 2 by reference to the position in relation to the respective functional element or control of interest, which is transferred by the pointer 8. For this purpose, there are assignment tables between the positions, elements and information texts in the database 7.

In the exemplary embodiment, an electromagnetic locating method, for example, is used for determining the position of the functional element or control which is of interest. For this reason, the reference field transmitter 4 is as provided with an antenna in the control and output unit 1.

Figure 2:
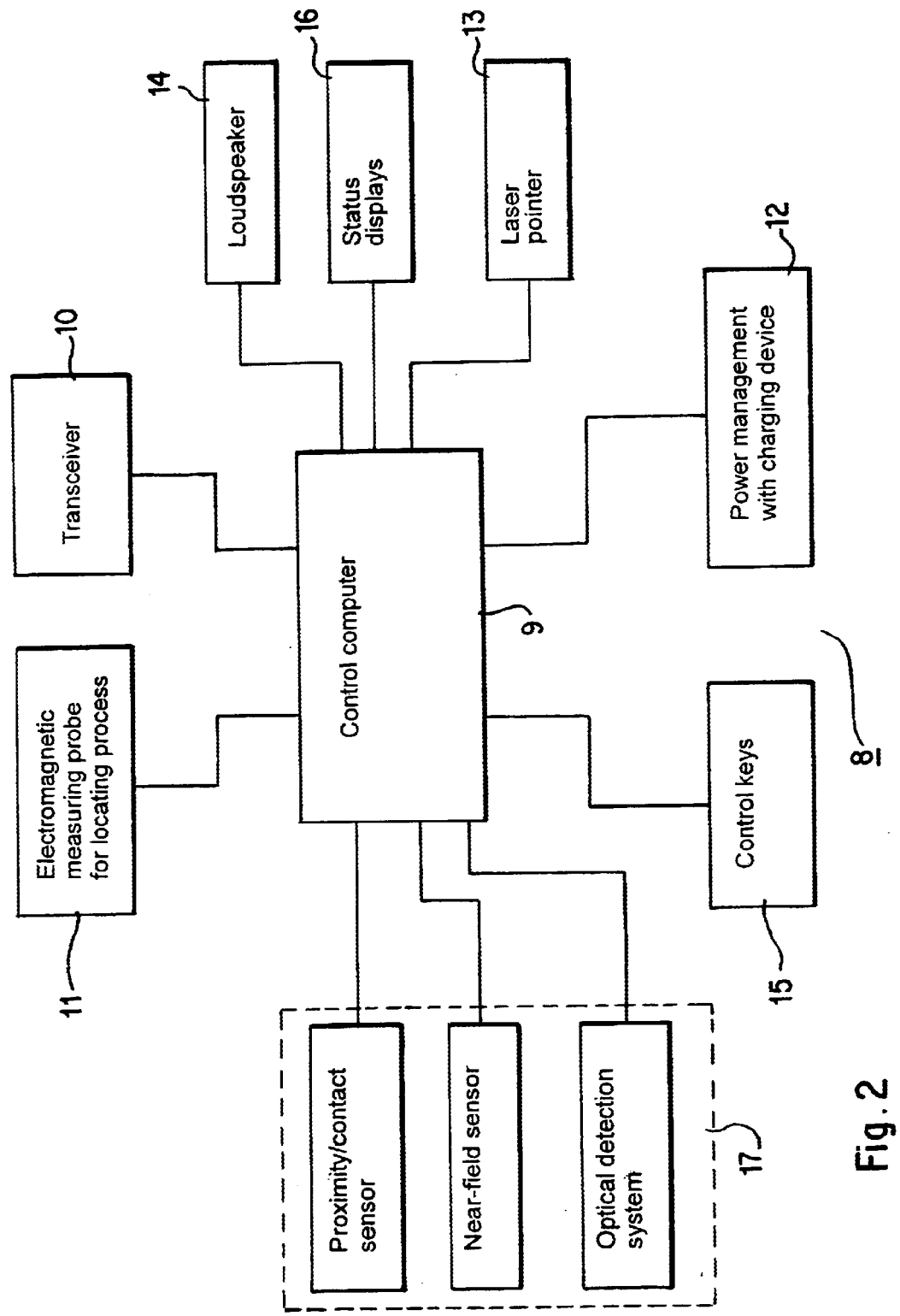
FIG. 2 shows the computer-supported pointer of the information system, which can be picked up in the hand, as a block diagram.

The pointer 8 which is shown in FIG. 2 and which can be picked up in the hand is equipped with a control computer 9, transceiver 10, an electromagnetic measuring probe 11, a charging device 12, a laser pointer 13, loudspeaker 14 and with control pushbutton keys 15 and status displays 16.

The pointer 8 could, in contrast to the refinement described above, also be accommodated in the vehicle key or in the keyless go card as an element with a shape ranging from a pin to that of a pear, this element coming to a point at the front and being provided with a number of pushbutton keys, and if appropriate with a status display.

The control keys 15 are used to control the voice response with the functions "Pause, Continue, Repeat, Stop, . . . ". An individual control key 15, which alternately has the function "Pause" and "Continue" is also optionally sufficient for this. A repetition of the explanation would be provided here by selecting/touching the same functional element or control again, a final abort of the information text by re-inserting the pointer 8 into the holder and a renewed explanation relating to a further element would be obtained by selecting/touching this element again.

Optional locating methods 17 for determining the position of the respective functional element or control which is to be explained can be used optionally or in addition to the electromagnetic locating method of the exemplary embodiment.

The following locating possibilities can be used for the solution according to the invention:

| | |
|---|---|
| locating in space: | optical |
| | acoustic |
| | electromagnetic |
| locating on the surface: | optical |
| | acoustic |
| | electromagnetic |
| | electrical |
| near-field sensors: | optical |
| | barcode |
| | pixel coding |
| | transponder |
| | electrical |

The selection of a locating method is finally a question of cost in relation to the precision which can be achieved. A combination of two or three different locating methods can also be used for increasing the locating precision.

The pointer 8 of the exemplary embodiment is equipped with a laser pointer 13 to increase the pointing accuracy. A visible laser beam emerges from the tip of the pointer 8 and can be used to make it easier to position the pointer precisely, near to the functional element or control which is to be explained.

A position measurement/explanation is triggered by:
touching the functional element or control (evaluation of noise/acceleration of the pointer; switch in the tip; approximating sensor acoustic/optical/electrical),
pressing a key on the pointer
voice command ("what is this?") if the system is additionally equipped with a voice inputting system for this purpose, i.e. a microphone in the pointer, a voice recognition unit in the vehicle.

In exemplary embodiment, triggering is brought about by touching the functional element or control which is to be explained.

The information text is output in a multi-level fashion, for example in the levels:
general explanation,
operating instructions,
safety instructions,
instructions on related subjects.

The desired level can be called up directly by touching an appropriate number of times with the pointer or by pressing a "Continue" key on the pointer 8. If this does not happen, the outputting runs through all the abovementioned information levels automatically.

For outputting of the information text outside the passenger compartment, the pointer 8 is equipped with a loudspeaker 14 which acoustically supports the internal loudspeakers. The sound volume of this loudspeaker can be increased automatically.

Given appropriate supplementation by a voice inputting means, the information system according to the invention is able to support the user when searching for an element. For this purpose, the user would make an acoustic inquiry with respect to the locality of a control using a voice command: "location of first aid kit?".

In addition to the acoustic/graphic explanation which would be triggered by the voice inputting means in this case, the user could pick up the pointer in his hand and point to what he assumes to be the control. The system would follow the position of the pointer or the pointing beam and provide instructions to bring the user to the correct position—"no, further to the right!"—and instructions on the correct method of operation—"you will see the towing eyelet when you take off the cover!". The locating operation could also be supported by projecting arrows from the pointer onto the surface of the vehicle, which projection is controlled in such a way that an arrow always points in the direction of the control which is being searched for. In further expansion levels the information system could also be used as an indicating and registration element in workshops, in quality control or when purchasing and selling vehicles. A microphone which is built into the pointer could also permit voice to be input outside the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An information system for providing explanatory information concerning functional elements or controls in motor vehicles, wherein one of the functional elements or controls which is of interest is selected by means of a hand-held computer-supported pointer located near said selected functional element or control and wherein locating data indicating a position represented by said pointer are determined and said locating data are transferred to a computer-supported control and output unit in which a stored information text is selected as a function of said locating data and is output to a user via a voice response system.

2. The information system according to claim 1, wherein the functional element or control is selected by means of a reference field transmitter and a measuring probe using an electromagnetic locating method.

3. The information system according to claim 2, wherein the selecting of the functional element or control is carried out alternatively or additionally to the electromagnetic method with optional selecting, which comprises selecting by means of near-field sensors or surface sensors.

4. The information system according to claim 1, wherein the outputting of information is triggered by touching the functional element or control with the pointer.

5. The information system according to claim 1, wherein the outputting of information is triggered by means of a pushbutton key or audibly by means of a voice input at the pointer.

6. The information system according to claim 1, wherein communication between the pointer and the control and output unit is carried out in a wire-free manner via transceivers.

7. The information system according to claim 1, wherein calibration of the locating methods is carried out when the pointer is placed in a holder.

8. A system for providing details concerning functional elements or controls of a motor vehicle, said system comprising:
    hand-held means for providing position data concerning the selection of a particular one of said functional elements or controls;
    means for transferring said position data to a device storing a plurality of information text;
    means for selecting one of said plurality of information text as a function of said position data; and
    means for outputting said selected text to a user of said hand-held means.

* * * * *